United States Patent
Woodard

[11] 3,910,629
[45] Oct. 7, 1975

[54] TELESCOPIC COVER FOR THE LOAD-CARRYING BODY OF A TRUCK

[76] Inventor: Boyd Woodard, 6995 NW. 32nd Ave., Miami, Fla. 33147

[22] Filed: Dec. 23, 1974

[21] Appl. No.: 535,272

[52] U.S. Cl. .................. 296/137 B; 296/137 G
[51] Int. Cl.² ............................................ B60J 7/00
[58] Field of Search......... 296/137 R, 137 B, 137 E, 296/137 G, 98, 137 C, 100

[56] References Cited
UNITED STATES PATENTS

| | | | |
|---|---|---|---|
| 2,853,340 | 9/1958 | Hershberger | 296/137 B |
| 2,861,836 | 11/1958 | Goeggel | 296/137 C |
| 3,578,378 | 5/1971 | Anderson | 296/137 B |
| 3,675,967 | 7/1972 | Ahrens | 296/137 B |
| 3,762,763 | 10/1973 | Deshores | 296/137 B |

Primary Examiner—Allen N. Knowles

[57] ABSTRACT

A telescopic cover for the load-carrying body of a truck comprised of a plurality of cover sections which are adapted to be moved from a retracted or open disposition to an extended or closed disposition relative to the open top of the load-carrying body. Motor actuated cables are employed to selectively move said telescopic cover to said retracted or extended positions.

14 Claims, 8 Drawing Figures

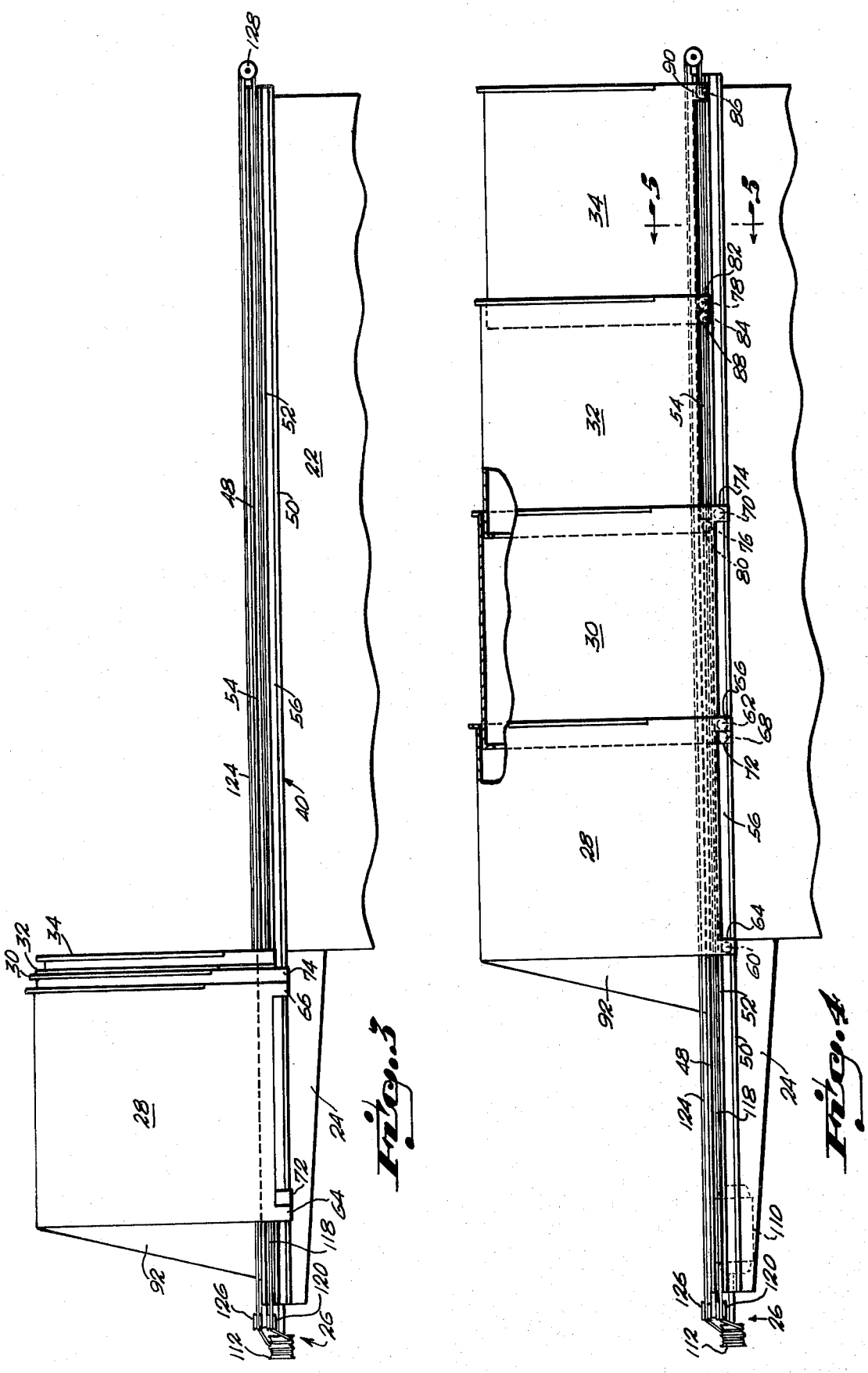

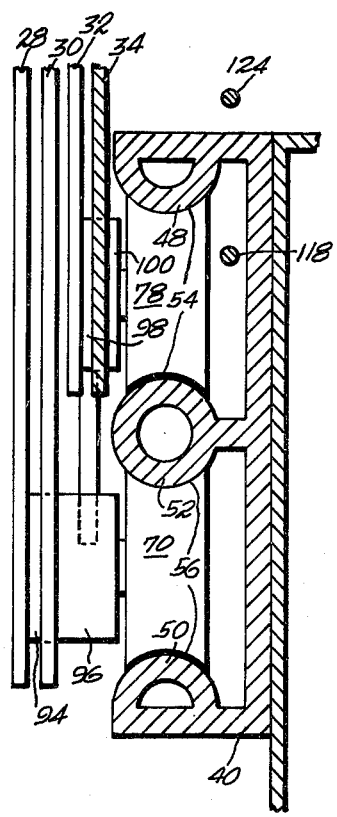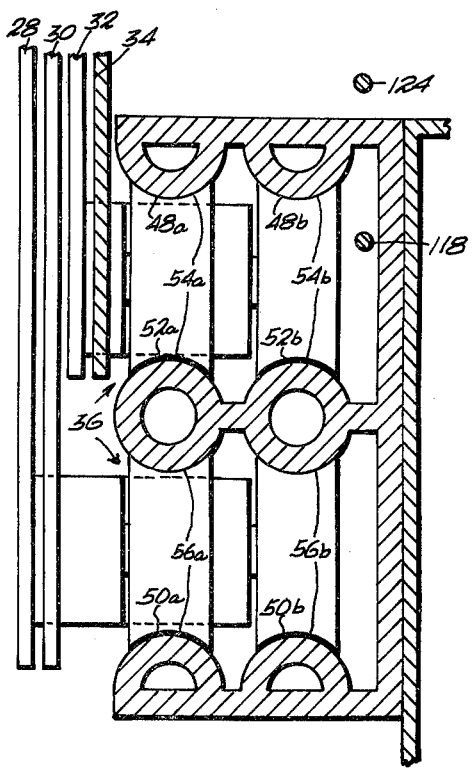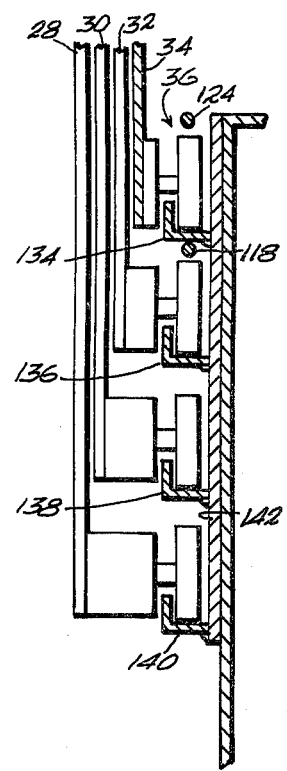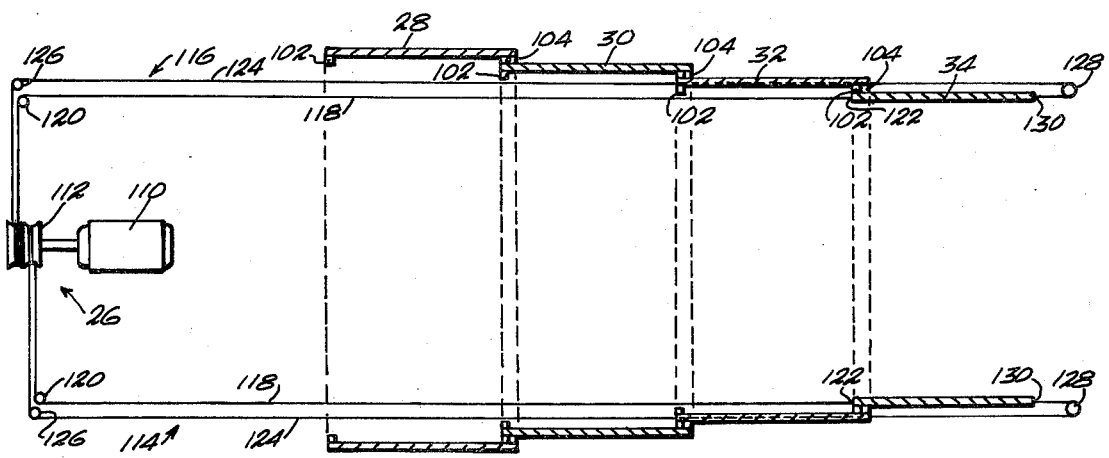

TELESCOPIC COVER FOR THE LOAD-CARRYING BODY OF A TRUCK

STATE OF THE PRIOR ART

U.S. Pat. No. 3,549,197 to Louis F. Sibley and U.S. Pat. No. 3,549,198 to Ignazio Capello both disclose forms of a dump truck cover comprised generally of a flexible cover such as a tarpaulin or canvas which is normally wound on a shaft, drum, reel or the like. A swingable bail or yoke is employed to extend the flexible cover to a covering relation with the open top of the truck. Means are provided to rewind the flexible cover on the shaft, drum or reel when the bail or yoke is actuated to uncover the open truck top.

BACKGROUND OF THE PRESENT INVENTION

The Present invention is directed to a telescopic cover for the load-carrying body of a truck which is normally carried in a retracted disposition relative to the front portion of said load-carrying body. Actuation of a cable means connecting between a power transmitting means and the cover extends the telescopic cover to a covering relationship relative to the open top of the load-carrying body.

While the telescopic cover of the present invention is adaptable to a variety of different types of load-carrying truck bodies, one particular application of the device is directed to dump trucks which are frequently employed to haul relatively fine, loose materials such as dirt, sand, gravel or the like which readily blow from the trucks, particularly when they attain relatively high speeds. Cargoes of this nature are generally wet or damp to an extent that, in addition to pelting following automobiles and motorcycles, a gooey residue is deposited on the bodies as well as the windshields thereof, creating a driving hazard.

The telescopic cover of the present invention is comprised generally of a plurality of cover sections which are normally retracted in a telescoped condition forwardly of the front of the loadcarrying body. In some applications the cover sections may be normally positioned over the front portion of the load carrying body. The respective cover sections ride on rollers in track means fixed relative to the upper longitudinal edges of said load body, and motor or hand crank actuated cables are employed to selectively move said telescopic cover sections from extended positions in covering relation to the normally open top of the load body to fully telescoped, retracted positions for loading purposes.

BRIEF DESCRIPTION OF THE DRAWINGS

FIG. 3 is a side elevational view of the top portion of the load carrying body of a truck with the telescopic cover in a completely telescoped or retracted disposition;

FIG. 4 is a view similar to FIG. 3 illustrating the telescopic cover in a fully extended disposition;

FIG. 5 is a vertical cross-sectional view taken along the line 5—5 of FIG. 4, illustrating one preferred form of track means for the telescopic cover;

FIG. 6 is a sectional view similar to FIG. 5 illustrating a modified form of track means;

FIG. 7 is a sectional view similar to FIGS. 5 and 6 illustrating a further modification of the track means; and FIG. 8 is a schematic illustration of the telescopic cover relative to the motor actuated cable means employed to selectively move the telescopic cover to retracted or extended positions.

DETAILED DESCRIPTION OF THE DRAWINGS

Figure 1:
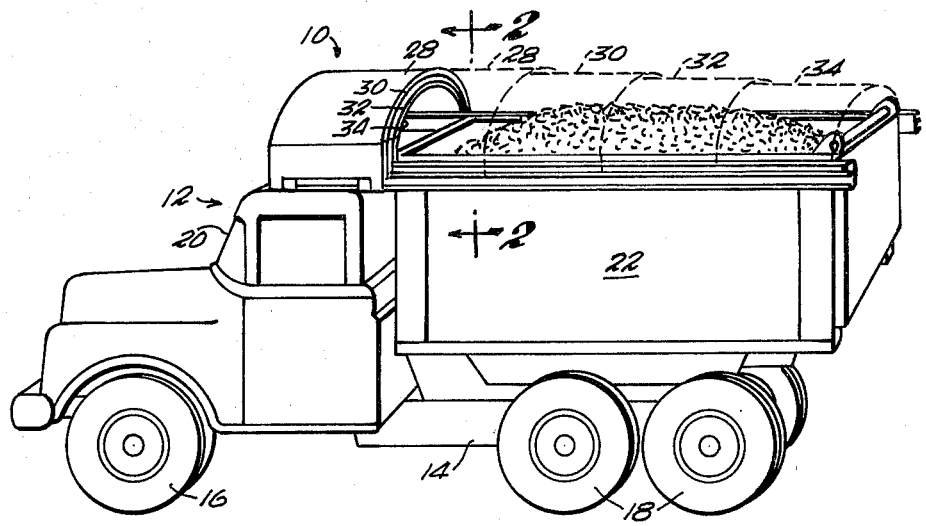
FIG. 1 is a perspective view of a dump truck provided with a telescopic cover in accordance with the present invention.

With reference to the drawings in which like reference characters designate like or corresponding parts throughout the various views and with particular reference to FIG. 1, the telescopic cover for the load carrying body of a truck of the present inveniton is designated generally at 10, as applied to a typical dump truck 12, which includes a frame or chassis 14, front and rear wheels 16 and 18, a driver's cab 20 and a dump type load carrying body 22.

This type of vehicle generally provides a forwardly-extending protective member 24 (FIGS. 3 and 4) from the top front edge of the load carrying body, which projects over the driver's cab 20. As will be more fully apparent from the subsequent description, this member 24 may be utilized to mount the drive means, generally indicated at 26, when the device is applied to a dump truck type of vehicle as illustrated in the drawings.

Figure 2:
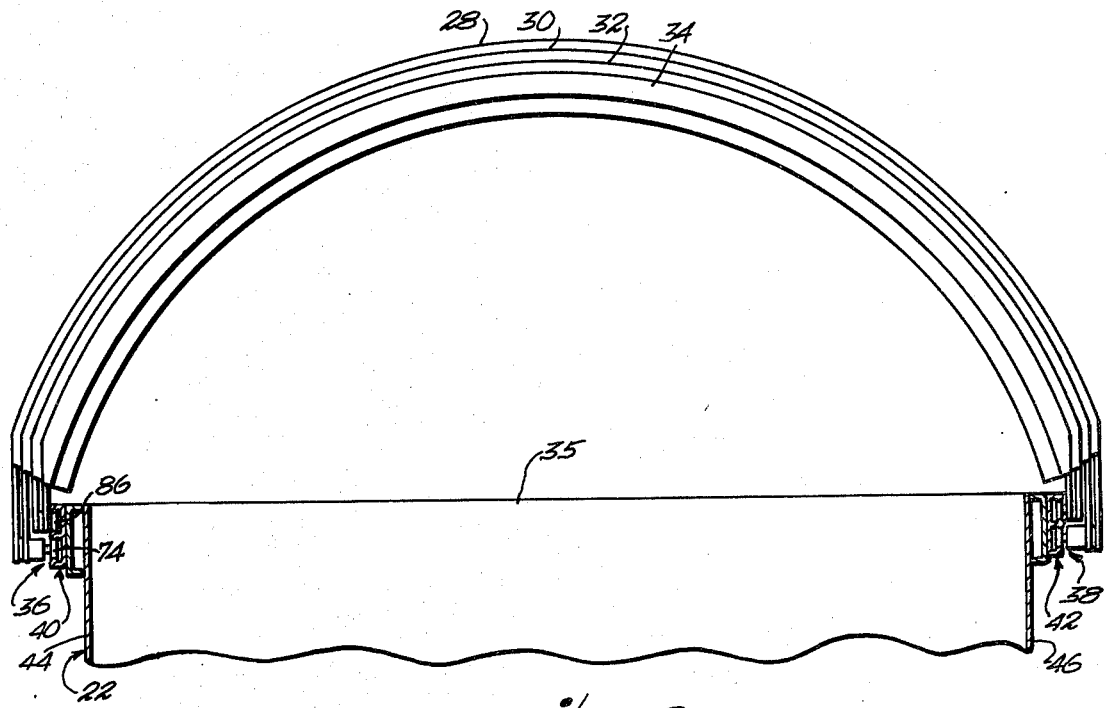
FIG. 2 is a cross-sectional view taken along the line 2—2 of FIG. 1.

As best illustrated in FIGS. 3 and 4, the protective cover 10 is comprised of four sections, 28, 30, 32 and 34, which are movable from the fully retracted or telescoped disposition of FIG. 3 to the fully extended position of FIG. 4 to completely cover the normally open top 35 (FIG. 2) of the load carrying body 22. The cover sections, as illustrated, are generally of an arched configuration in cross section and roller means, generally indicated at 36 and 38 in FIG. 2, are carried on the respective side skirt portions of each section, the rollers 36 and 38 being engaged with respective track members 40 and 42, fixed relative to the opposed top edge portions of the side walls 44 and 46 of the load carrying body 22.

Each of the track members, such as track 40 in FIG. 5, may be formed as an extrusion to define upper and lower semi-circular rails 48 and 50 and a centrally-disposed, generally circular rail 52, to form an upper track 54 and a lower track 56. The arrangement and operation of the roller means 36 and 38 relative to the respective side track members 40 and 42 are identical and will be described relative to the one side illustrated in FIG. 4 which illustrate the four cover sections 28, 30, 32 and 34 in a fully extended disposition.

The front or first cover section 28 provides front and rear rollers 60 and 62, rotatably carried by respective skirt extensions 64 and 66 of section 28, which are engaged in the lower track 56. In like manner, rollers 68 and 70 carried by skirt extensions 72 and 74, provided by the second cover section 30, are engaged in the lower track 56 in a manner whereby the two sections are movable, relative to each other, between a retracted, telescoped disposition to an extended disposition.

The third cover section 32 provides front and rear rollers 76 and 78, rotatably carried by respective skirt extensions 80 and 82 thereof, which are engaged in the upper track 54. Rollers 84 and 86 carried by skirt extensions 88 and 90 of the fourth or rear cover section 34 are likewise engaged in the upper track 54.

Therefore, the four cover sections 28, 30, 32 and 34 are movable between the fully retracted, telescoped condition relative to the open top 35 of the load body 22, illustrated in FIG. 3, to the fully extended condition relative to the open top 35 of FIG. 4. The front section includes a front wall 92, extending thereacross, which is preferably angled forwardly and downwardly to protect the material in the load body 22 from the influences of the wind forces when the vehicle is in motion.

With reference to FIG. 5, variable lengths of blocks 94, 96 and 98, 100, fixed to the respective skirt extensions of the cover sections 28, 30, 32 and 34 carry the four pairs of aforementioned rollers on both sides of said cover sections.

The four cover sections 28, 30, 32 and 34 are mechanically interconnected by appropriate abutment means or dogs to provide the necessary telescopic movement of said sections relative to each other. While various forms and arrangements of parts may be provided, FIG. 8 schematically illustrates the principle involved with the use of dogs fixed to the respective cover sections. Front and back dogs 102 and 104 are fixed to each of the cover sections 28, 30 and 32 and a front dog 102 is fixed to the rear cover section 34. When a forward motivating force is applied to the section 34 of FIG. 8, the front dog 102 on each of the four sections successively picks up the front dog 102 on the next succeeding section causing the four sections to assume the telescoped disposition of FIG. 3.

When a rearward motivating force is applied to the section 34, as seen in FIG. 3, the front dog 102 on each of the four cover sections 28, 30, 32 and 34 successively picks up the back dog 104 on the next succeeding section causing said four sections to assume the fully extended disposition of FIGS. 4 and 8.

It should be understood that the arched configuration of the cover sections 28, 30, 32 and 34 as illustrated is by way of example only and is not intended as a limitation. A variety of configurations and materials may be employed to accomplish the same end and the application of the structure of the present invention is not limited to a dump truck. It will also be obvious that the number of cover sections and associated tracks can be varied to accommodate various truck lengths.

With particular reference to FIGS. 4 and 8, the drive means 26 for the cover sections 28, 30, 32 and 34 is comprised of a motor means 110, which may be fixed to the protective member 24, in driving connection with a pulley means 112. Two cables 114 and 116, engaged about the pulley means, extend outwardly therefrom in generally opposed directions. Each cable includes a first run 118, directed rearwardly by a pulley 120 to a point of attachment 122 to the front end of the rear cover section 34, and a second run 124 similarly directed by a pulley 126 to a second pulley 128, mounted at the rear end to one of the track members 40 or 42, said second run thereby being redirected forwardly to a point of attachment 130 to the rear end of the rear cover section 34.

The motor means is of the reversible type to permit selective operation thereof to move the four cover members to either of the dispositions illustrated in FIGS. 3 and 4 in the manner above described.

FIG. 6 illustrates a first modification of the track members wherein each track member provides a pair of parallel upper tracks 54a and 54b and a pair of parallel lower tracks 56a and 56b, formed by upper and lower pairs of semi-circular rails 48a, 48b, and 50a, 50b, and a pair of centrally disposed, generally circular rails 52a and 52b. The operation of the cover sections 28, 30, 32 and 34 is identical as when applied to the track members previously described with the exception that the roller means 36 or 38 are provided with individual tracks for each of said four cover sections.

With reference to FIG. 7, a second modification of the track members is illustrated which incorporates four individual tracks 134, 136, 138 and 140 in a vertical, parallel relationship. Each track is angular in form and may be formed integral with a base plate 142, fixed to the load carrying body, or may be fixed thereto as by welding. The operation of the cover sections 28, 30, 32 and 34 is identical as when applied to either of the first two track forms with the exception that the roller means 36 or 38 are provided with individual tracks for each of the four cover sections in a vertical, parallel relationship.

What is claimed is:

1. A telescopic cover for the load carrying body of an open top truck comprising;
  A. a plurality of telescopic cover sections, adapted to be moved from a normally open, retracted disposition to an extended, closed disposition relative to the open top load-carrying body of the truck;
  B. upper and lower track means fixed to and extending along the length of both sides of the load-carrying body;
  C. roller means carried by opposed, generally downwardly-extending side skirt portions of each of said plurality of cover sections, engaged with said track means for rearward and forward movement therealong;
  D. reversible motor drive means;
  E. a first pulley means, drivingly connected to said motor drive means;
  F. cable means, engaged with said first pulley means, connected to one of said cover sections in a manner whereby said telescopic cover sections may be selectively moved from said normally open, retracted disposition to said extended, closed disposition or from said extended, closed disposition to said normally open, retracted disposition; and
  G. a second pulley means to direct said cable means to said one cover section,
  and said roller means of a portion of said plurality of telescopic cover sections are engaged with each of said upper and lower parallel tracks.

2. The device as defined in claim 1 wherein each of said telescopic cover sections comprises said opposed side skirt portions and a closed main body portion extending therefrom across the open truck top.

3. The device as defined in claim 1 including interengaging abutment means on each of said plurality of telescopic cover sections whereby said plurality are successively interengaged to provide telescopic movement thereof to said fully retracted or fully extended disposition depending upon the direction of operation of said reversible motor drive means.

4. The device as defined in claim 1 including a transverse front cover wall on the forward cover section of said plurality.

5. The device as defined in claim 4 wherein said transverse front cover wall is angled forwardly and downwardly.

6. The device as defined in claim 1 wherein said roller means carried on each of said cover sections comprises one roller carried by a skirt extension at the leading and trailing edge of each side of each of said cover sections.

7. The device as defined in claim 1 wherein said first pulley means is comprised of a double pulley and said cable means is comprised of two cables, respectively engaged about the two portions of said double pulley, and providing two cable runs extending outwardly therefrom in generally opposed directions.

8. The device as defined in claim 7 wherein said second pulley means includes a pair of single pulleys fixed relative to each of the opposed front corners of the load-carrying body to direct the two runs of each cable rearwardly to points of attachment to said one cover section.

9. The device as defined in claim 8 wherein said one cover section comprises the rearmost cover section when said cover sections are in their extended disposition, one of said runs of each cable being fixed relative to the leading edge thereof and the second of each runs being directed around a pulley, fixed relative to the rear end of the load-carrying body, to a point of attachment to the trailing edge thereof.

10. The device as defined in claim 1 wherein said track means for each side of the load-carrying body is comprised of upper and lower side-by-side pairs of longitudinally-extending parallel tracks.

11. The device as set forth in claim 10 wherein said plurality of telescopic cover sections is comprised of four sections, the roller means of said four sections being engaged respectively in said upper and lower pairs.

12. The device as defined in claim 1 wherein said plurality of telescopic cover sections is comprised of four sections, the roller means of two of said sections being engaged with each of said upper and lower longitudinally-extending, parallel tracks.

13. The device as defined in claim 1 wherein said track means for each side of the load-carrying body is comprised of four vertically-aligned, parallel tracks.

14. The device as defined in claim 13 wherein said plurality of telescopic cover sections is comprised of four sections, the roller means of said four sections being engaged respectively in said four vertically aligned, parallel tracks.

* * * * *